United States Patent
McLaren et al.

(10) Patent No.: US 9,178,642 B2
(45) Date of Patent: Nov. 3, 2015

(54) RECEIVERS AND TRANSCEIVERS FOR OPTICAL MULTIBUS SYSTEMS

(75) Inventors: Moray McLaren, Bristol (GB); Nathann Lorenzo Binkert, Redwood City, CA (US); David A. Warren, El Dorado Hills, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 143 days.

(21) Appl. No.: 13/881,004

(22) PCT Filed: Oct. 27, 2010

(86) PCT No.: PCT/US2010/054269
§ 371 (c)(1),
(2), (4) Date: Jun. 19, 2013

(87) PCT Pub. No.: WO2012/057749
PCT Pub. Date: May 3, 2012

(65) Prior Publication Data
US 2013/0259483 A1    Oct. 3, 2013

(51) Int. Cl.
*H04B 10/00* (2013.01)
*H04J 14/02* (2006.01)
*H04B 10/278* (2013.01)

(52) U.S. Cl.
CPC ............. *H04J 14/02* (2013.01); *H04B 10/278* (2013.01)

(58) Field of Classification Search
USPC .................................................. 398/202–214
See application file for complete search history.

(56) References Cited

U.S. PATENT DOCUMENTS

| | | | | |
|---|---|---|---|---|
| 5,036,512 A * | 7/1991 | Cloonan et al. | ................. | 398/65 |
| 5,654,812 A * | 8/1997 | Suzuki | ........................ | 398/98 |
| 5,663,818 A * | 9/1997 | Yamamoto et al. | ............ | 398/58 |
| 5,859,846 A | 1/1999 | Kim et al. | | |
| 6,411,418 B1 * | 6/2002 | Deri et al. | ..................... | 398/182 |
| 6,650,808 B1 | 11/2003 | Vujcic et al. | | |
| 6,661,940 B2 * | 12/2003 | Kim | .............................. | 385/15 |
| 7,499,647 B2 * | 3/2009 | Way et al. | ....................... | 398/3 |
| 2002/0012152 A1 * | 1/2002 | Agazzi et al. | ................ | 359/189 |
| 2003/0169957 A1 * | 9/2003 | Deutsch | ......................... | 385/14 |

(Continued)

FOREIGN PATENT DOCUMENTS

| | | |
|---|---|---|
| GB | 2420036 | 5/2006 |
| GB | 2420037 | 10/2006 |
| JP | H07-162400 A | 6/1995 |
| JP | 07-253519 A | 10/1995 |

(Continued)

OTHER PUBLICATIONS

International Search Report and Written Opinion, May 26, 2011. PCT Application No. PCT/US2010/054269.

*Primary Examiner* — Agustin Bello
(74) *Attorney, Agent, or Firm* — Olympic Patent Works PLLC

(57) ABSTRACT

This disclosure is directed to optical-to-electrical receiver and transceiver integrated circuits that can be used to send and receive multiple optical signal data streams using at least one optical bus. In one aspect, a fan-in integrated circuit of a node includes an arbiter/multiplexer, and at least one receiver. Each receiver is electronically connected to the arbiter/multiplexer. Each receiver receives at least one optical signal over an optical broadcast bus and converts the optical signals into a data stream encoded in electronic signals. The arbiter/multiplexer selects one receiver at a time to send an electronic signal to the arbiter/multiplexer and outputs the electronic signal to the node for processing.

13 Claims, 17 Drawing Sheets

(56) References Cited

U.S. PATENT DOCUMENTS

| | | | |
|---|---|---|---|
| 2004/0151507 A1* | 8/2004 | Agazzi | 398/141 |
| 2004/0208570 A1* | 10/2004 | Reader | 398/79 |
| 2004/0218933 A1 | 11/2004 | Fludger et al. | |
| 2005/0078957 A1* | 4/2005 | Hendow | 398/33 |
| 2006/0093373 A1 | 5/2006 | Hahin et al. | |
| 2006/0171714 A1 | 8/2006 | Dove | |
| 2010/0021166 A1 | 1/2010 | Way et al. | |
| 2011/0286743 A1* | 11/2011 | McLaren et al. | 398/45 |
| 2013/0259483 A1* | 10/2013 | McLaren et al. | 398/79 |

FOREIGN PATENT DOCUMENTS

| | | |
|---|---|---|
| JP | 2001-068720 A | 3/2001 |
| WO | WO-2008069591 | 6/2008 |
| WO | WO-2009096918 | 8/2009 |
| WO | WO-2009136896 A1 | 11/2009 |
| WO | WO-2009136897 | 11/2009 |

* cited by examiner

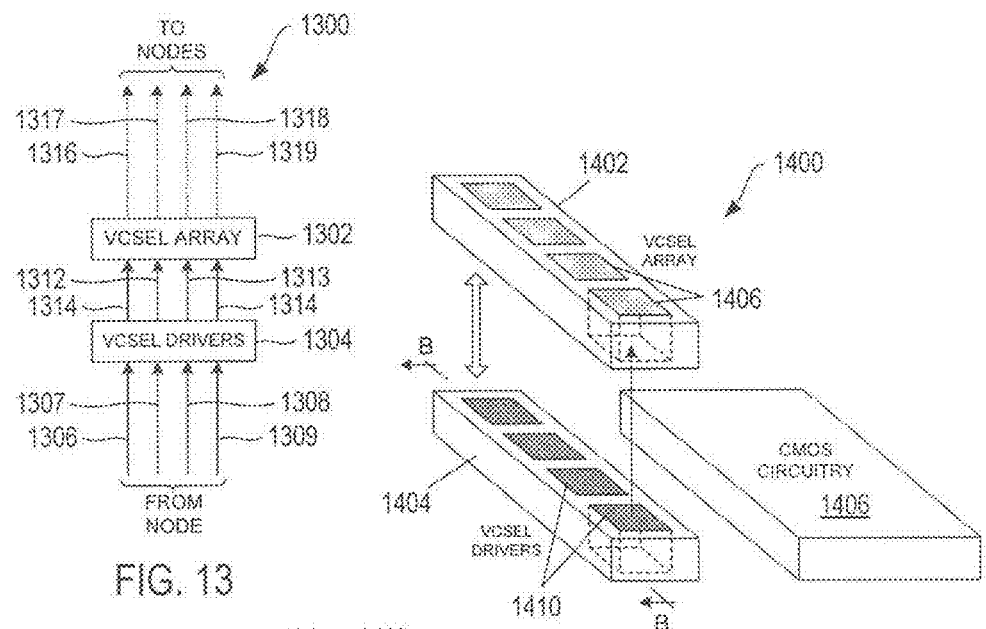
FIG. 13
FIG. 14A
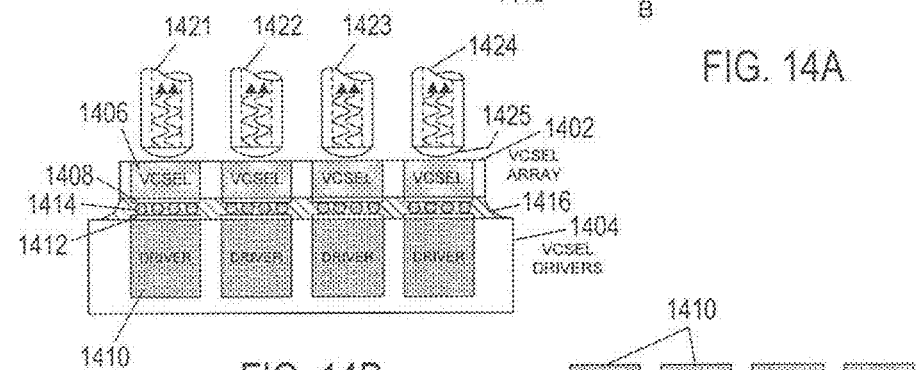
FIG. 14B
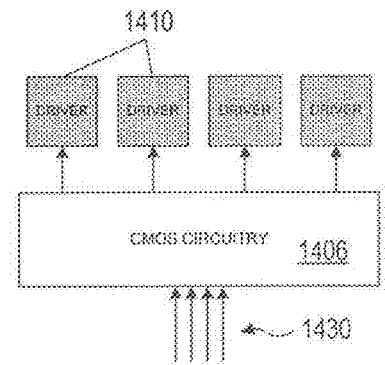
FIG. 14C

RECEIVERS AND TRANSCEIVERS FOR OPTICAL MULTIBUS SYSTEMS

TECHNICAL FIELD

The present disclosure relates to optical-to-electrical and electrical-to-optical interconnects.

BACKGROUND

Organizations that maintain and manufacture data centers face increasing bandwidth demands. In particular, the bandwidth requirement for routing switches is increasing dramatically due to the growth in data center size and due to the shift to higher bandwidth link standards, such as 10 Gb, 40 Gb, and 100 Gb Ethernet standards. However, simply scaling up the bandwidth of existing electronic switch designs can be problematic. The scope for increasing the data rate of electronic signals is often limited by signal integrity considerations. Also, increasing the bandwidth of electrical signal paths incurs a substantial penalty in both cost and power which may be impractical. The energy efficiency of the switching infrastructure in a modern data center has become an important consideration. As data rates increase, a greater proportion of the power consumed by network switches can be attributed to electronic interconnects. The result is that switch manufacturers and users continue to seek interconnect solutions that provide for several generations of bandwidth scaling at reduced interconnect power, without increasing the overall system cost.

BRIEF DESCRIPTION OF THE DRAWINGS

FIG. 13 shows a schematic representation of an example transmitter integrated circuit.

FIGS. 14A-14C show an example implementation of a transceiver.

DETAILED DESCRIPTION

This disclosure is directed to optical-to-electrical receiver and transceiver integrated circuits ("ICs") that can be used to send and receive multiple optical signal data streams using at least one optical bus. The detailed description is organized into two subsections as follows: A description of multibus optical interconnect fabrics is provided in a first subsection in order to give an example multibus optical system in which receiver and transceiver integrated circuits can be applied. Receiver and transceiver ICs are described in a second subsection. Although receiver and transceiver ICs are described with reference to examples of multibus optical interconnect fabrics, various receiver and transceiver ICs are not intended to be so limited in their application. In practice, receiver and transceiver ICs can be implemented in many different kinds of optical and electrical systems where optical-to-electrical and electrical-to-optical interconnections are used.

Multibus Optical Interconnect Fabrics

Multibus optical interconnect fabrics ("optical fabrics") transmit data encoded in optical signals. An optical signal encodes information in high and low amplitude states or phase changes of a channel of electromagnetic radiation. A channel refers to a single wavelength or frequency of electromagnetic radiation or a narrow band of electromagnetic radiation centered about a particular wavelength or frequency. For example, a high amplitude portion of an optical signal can represent a logic binary value ("bit") "1" and a low amplitude portion of the same optical signal can represent a bit "0," or vice versa. Optical fabrics can use multiple optical buses implemented in low loss waveguides and optoelectronics to replace the electronic connections and electronic fabric switches found in scalable data center switches. Optical fabrics are less constrained by signal integrity considerations and are amenable to higher spectral efficiency through the use of wavelength division multiplexing ("WDM") and various modulation formats. Optical communication with optical signals can also be more power efficient than communication with electronic signals due to the low loss properties of the optical channels.

Figure 1:
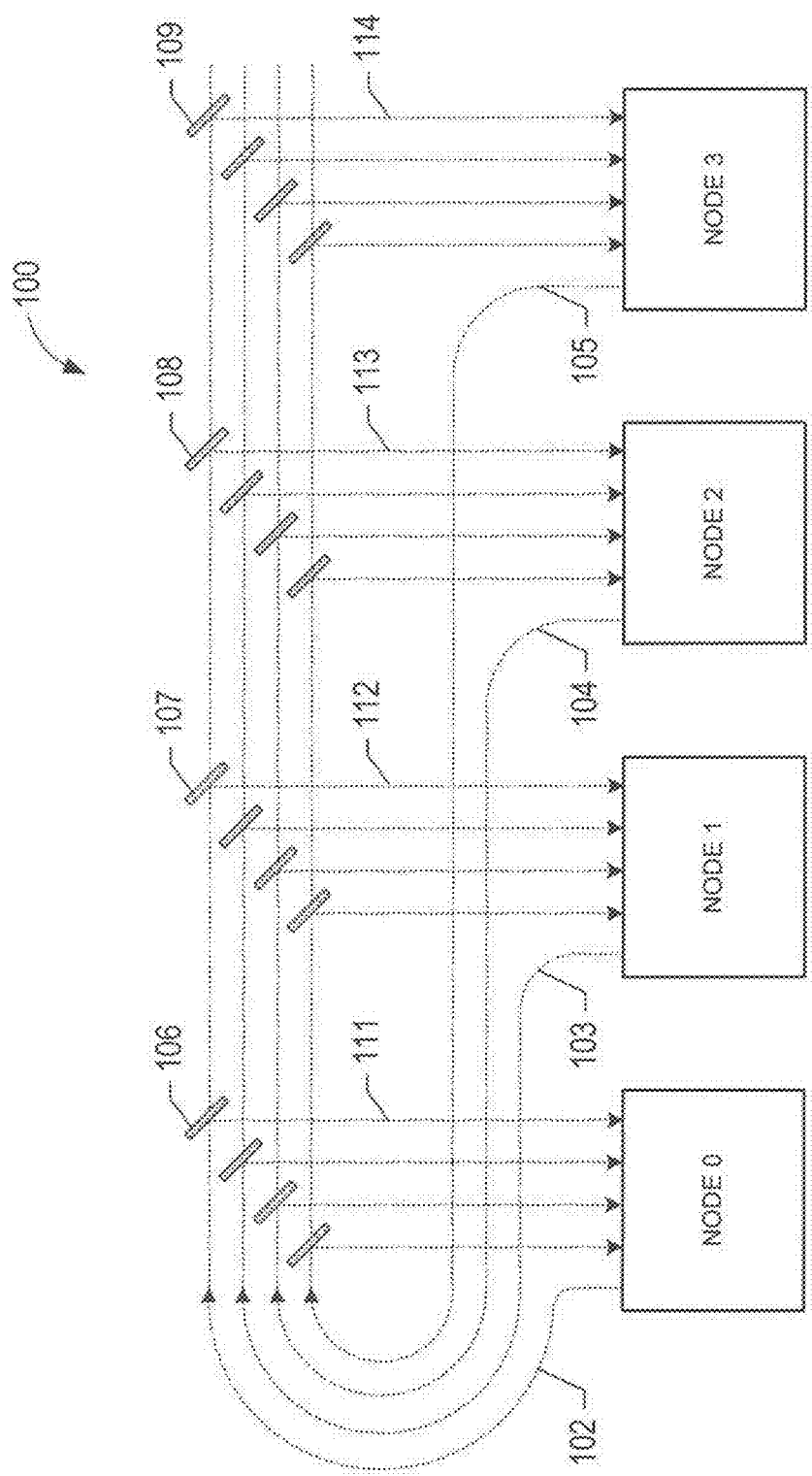
FIG. 1 shows a schematic representation of a first example multi-bus optical interconnect fabric.

FIG. 1 shows a schematic representation of an example multibus optical interconnect fabric 100. The optical fabric 100 includes four optical broadcast buses ("broadcast buses") 102-105, represented by dotted lines, enabling each of the four nodes labeled 0, 1, 2, and 3 to broadcast optical signals to itself and to three other nodes. As shown in the example of FIG. 1, each broadcast bus is optically coupled at one end to one of the nodes 0, 1, 2, and 3. A node can include any combination of processors, memory, memory controllers, electrical-to-optical engines, optical-to-electrical engines, clusters of multi-core processing units, a circuit board, external network connections, or any other data processing, storing, or transmitting device. For example, the nodes 0-3 can be line cards in a communication switch. In the example of FIG. 1, the optical fabric 100 includes 16 optical tap arrays distributed so that four optical tap arrays are located along each broadcast bus. Each optical tap array is configured to divert a portion of the optical power associated with the optical signals carried by a broadcast bus to a corresponding node. For example, four optical tap arrays 106-109 are distributed along broadcast bus 102. When node 0 broadcast optical signals over broadcast bus 102, optical tap array 106 diverts a portion 111 of the optical power associated with the optical signals back to node 0, optical tap array 107 diverts a portion 112 of the optical power associated with the optical signals to node 1, optical tap array 108 diverts a portion 113 of the optical power associated with the optical signals to node 2, and optical tap array 109 diverts a portion 114 of the optical power associated with the optical signals to node 3. As a result, nodes 0, 1, 2, and 3 each receive the same information encoded in the optical signals broadcast by node 0, but at a fraction of the optical power associated with the optical signals output from node 0.

Note that the optical fabric 100, and the optical fabrics described below, are not limited in their use to broadcasting optical signals. The optical fabrics can also be used for multicasts, broadcasts, or even unicasts. In other examples, the broadcast buses of multibus optical fabrics are bundled in order to reduce the number of optical tap arrays.

Figure 2:
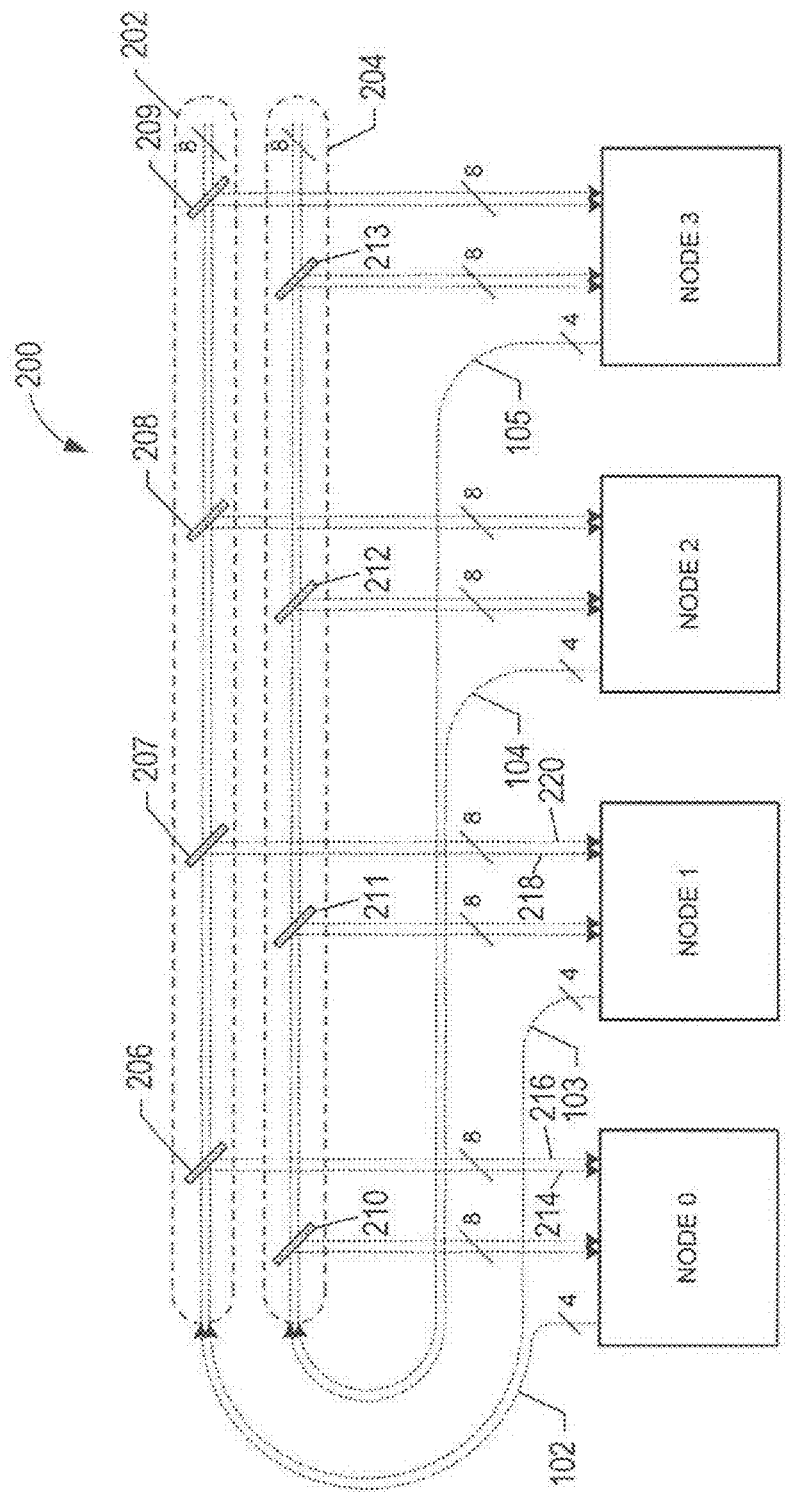
FIG. 2 shows a schematic representation of a second example multi-bus optical interconnect fabric.

FIG. 2 shows a schematic representation of an example multibus optical interconnect fabric 200. The optical fabric 200 is similar to the optical fabric 100, but instead of using 16 optical tap arrays, the broadcast buses are bundled, reducing the number of optical tap arrays by a factor of 2. In particular, optical fabric 200 includes the same four broadcast buses 102-105 as optical fabric 100, but with broadcast buses 102 and 103 bundled to form a bundled broadcast bus 202 and broadcast buses 104 and 105 bundled to form a bundled broadcast bus 204. Optical fabric 200 includes four optical tap arrays 206-209 distributed bundled broadcast bus 202 and four optical tap arrays 210-213 distributed along bundled broadcast bus 204. Each optical tap array is configured to divert a portion of the optical power associated with optical signals carried by a bundled broadcast bus to a corresponding node. For example, suppose that node 0 is broadcasting a first set of optical signals on broadcast bus 102 and node 1 is broadcasting a second set of optical signals on broadcast bus 103. Optical tap array 206 is configured to divert a portion 214 of the optical power associated with the first set of optical signal back to node 0 and divert a portion 216 of the optical power associated with the second set of optical signals to node 0. Optical tap array 207 is configured to divert a portion 218 of the optical power associated with the first set of optical signals to node 1 and divert a portion 220 of the optical power associated with the second set of optical signals back to node 1. Optical tap arrays 208 and 209 divert portions of the optical power associated with the first and second sets of optical signals to nodes 2 and 3, respectively. As a result, the nodes 0, 1, 2 and 3 each receive the same information encoded in the first and second sets of optical signals broadcast by nodes 0 and 1.

In the example of FIG. 2, the broadcast buses are composed of four waveguides. For example, as shown in FIG. 2, where broadcast bus 102 couples to node 0 slash "/" with the number "4" indicates that broadcast bus 102 is composed of four waveguides, and where optical tap array 206 diverts portions 214 and 216 of the optical power carried by bundled broadcast bus 202 of optical signals to node 0 is composed of 8 waveguides.

Figure 3A:
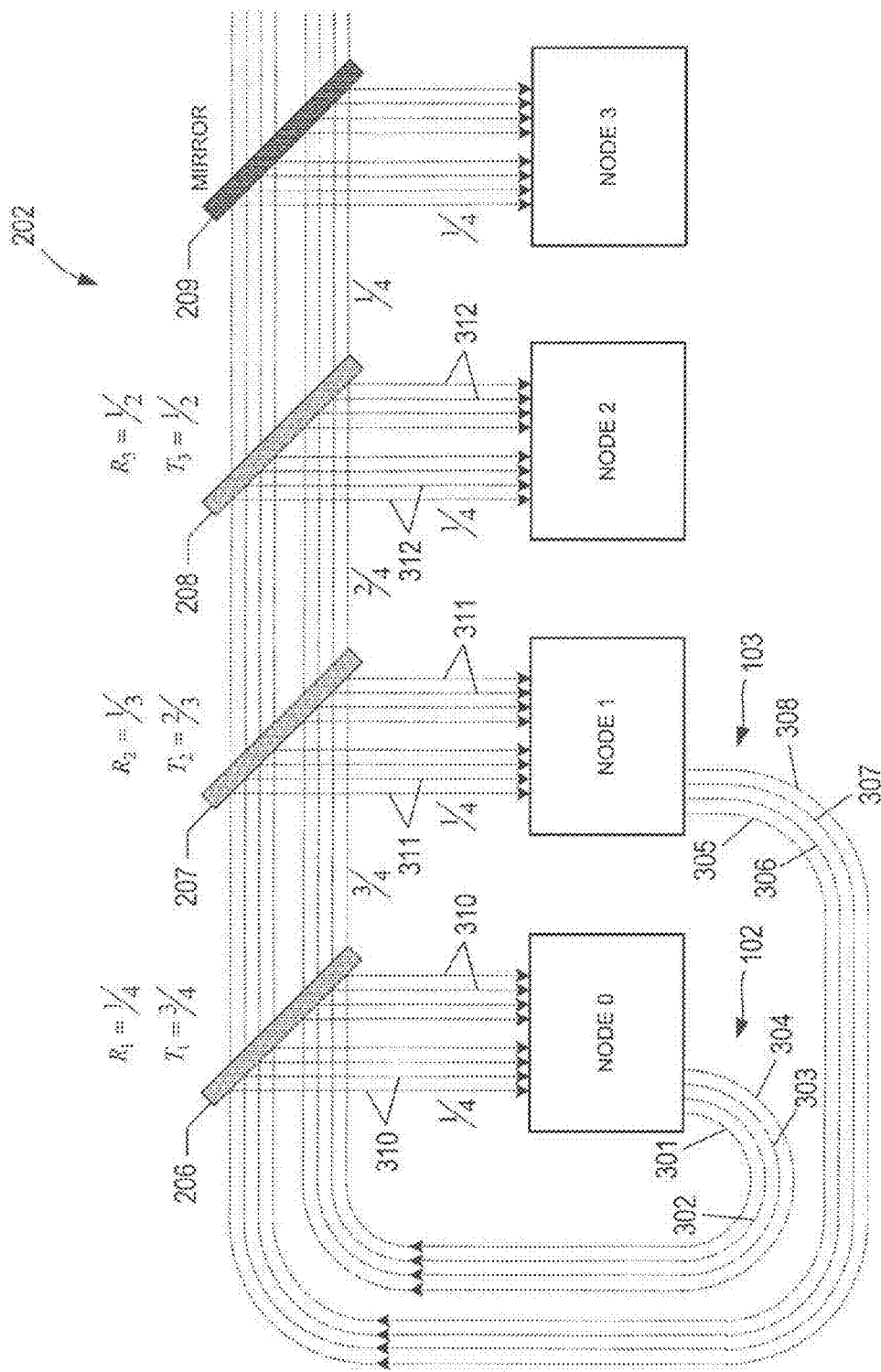
FIG. 3A shows an example of bundles of waveguides associated with two broadcast buses.

FIG. 3A shows the waveguides comprising the broadcast buses 102 and 103. In particular, broadcast bus 102 is composed of waveguides 301-304, and broadcast bus 103 is composed of waveguides 305-308. Each waveguide of a broadcast bus can transmit a separate optical signal generated by a node. For example, node 0 can broadcast data encoded in four separate optical signals, each optical signal carried by one of the four waveguides 301-304. Each optical tap array is composed of a number of optical taps, each of which is configured to divert a portion of the optical power associated with an optical signal carried by one of the waveguides. For example, optical tap array 206 is composed of eight optical taps (not shown) with each optical tap configured to divert a portion of the optical signal carried by one of the waveguides 301-308 toward node 0. Because each channel is carried by a separate waveguide, the channels can all be of the same frequency or each channel can have unique frequency.

FIG. 3A also reveals how the optical tap arrays can be configured to divert, using partial reflection, a portion of the optical power associated with the optical signals transmitted in the bundles of broadcast buses. In certain examples, the optical tap arrays distributed along a broadcast bus, or bundle of broadcast buses, can be configured so that each node receives approximately the same optical power associated with each optical signal. For example, as shown in the example of FIG. 3A, suppose that the optical power associated with each optical signal carried by the waveguides 301-308 is represented by P. In order for each node to receive the optical signals with approximately the same optical power P/4, optical tap array 206 is configured to reflect approximately ¼ and transmit approximately ¾ of the optical power of each optical signal carried by the waveguides 301-308. As a result, the optical power of each optical signal 310 reflected toward node 0 is approximately P/4, and the optical power of each transmitted optical signal is approximately 3P/4. The optical tap array 207 is configured to reflect approximately ⅓ and transmit approximately ⅔ of the optical power of each optical signal carried by the waveguides 301-308. As a result, the optical power of each optical signal 311 reflected toward node 1 is approximately P/4 (i.e., ⅓×3P/4), and the optical power of each transmitted optical signal is approximately P/2 (i.e., ⅔×3P/4). The optical tap array 208 is configured to reflect and transmit approximately ½ of the optical power of the optical signals carried by waveguides 301-308. As a result, the optical power of each optical signal 312 reflected toward node 2 is approximately P/4 (i.e., ½×P/2), and the optical power of each transmitted optical signal is also approximately P/4 (i.e., ½×P/2). The optical tap array 209 can be a fully reflective mirror that reflects the optical signals with the remaining optical power, P/4, to node 3.

Figure 3B:
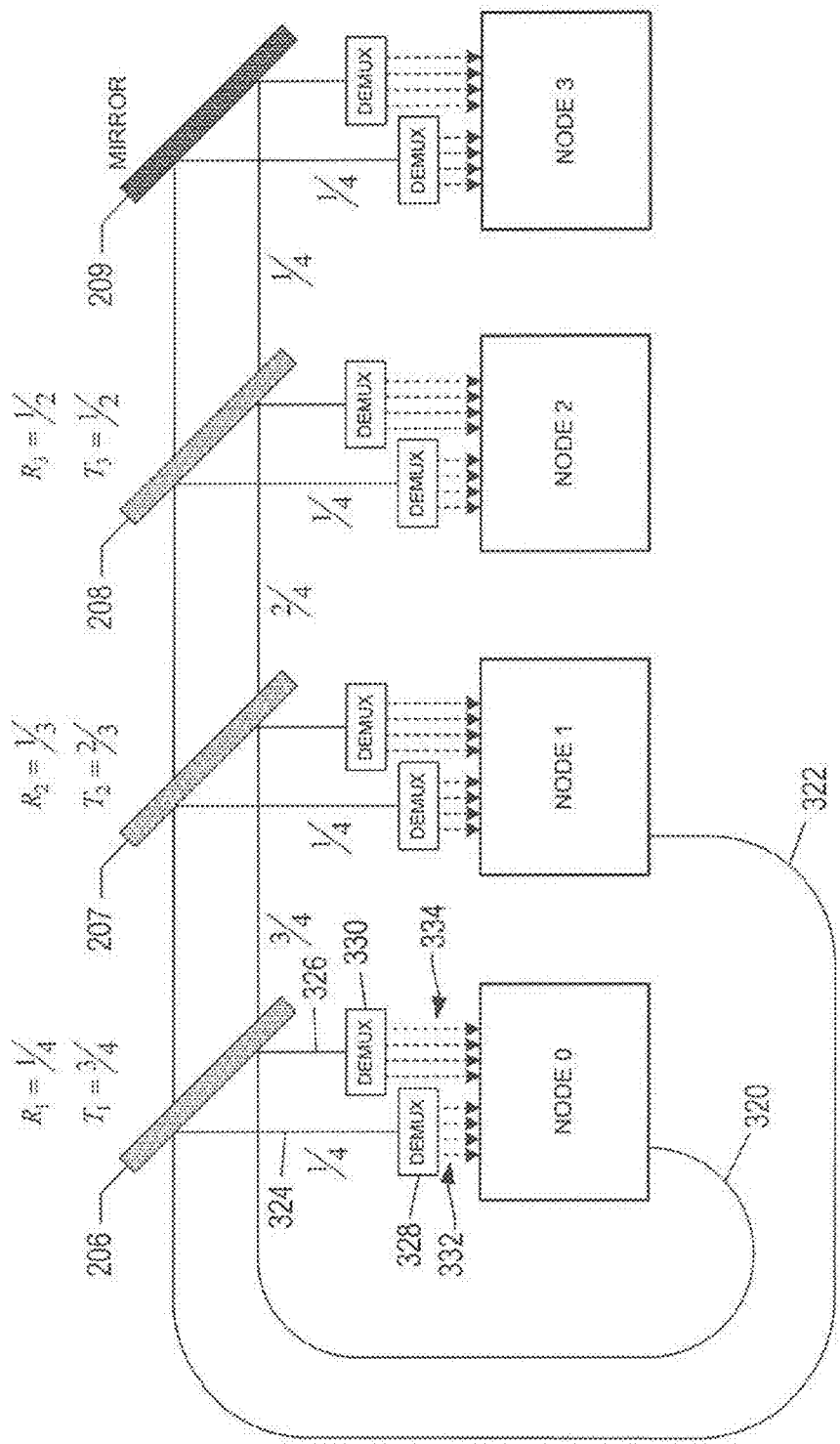
FIG. 3B shows an example of using wavelength division multiplexing to transmit channels in two broadcast buses.

Alternatively, rather than transmitting the optical signals output from a node in separate waveguides, the optical signals output from each node can be wavelength division multiplexed and transmitted by a single waveguide. FIG. 3B shows an example of using wavelength division multiplexing to transmit optical signals in two broadcast buses. In FIG. 3B, broadcast buses 320 and 322 are connected to nodes 0 and 1, respectively. Node 0 outputs a set of four optical signals that are wavelength division multiplexed into broadcast bus 320, and node 1 outputs a set of four optical signals that are also wavelength division multiplexed into broadcast bus 322. The broadcast buses 320 and 322 can be optical fibers or hollow waveguides. The optical tap arrays 206-208 split the optical power associated with optical signal as described above with reference to FIG. 3A. In the example of FIG. 3B, optical tap array 206 includes an optical tap that reflects approximately ¼ of the optical power associated with each of the optical signals carried by the waveguide 320 into a waveguide 324, and the optical tap array 206 reflects approximately ¼ of the optical power associated with each of the optical signals carried by waveguide 322 into a waveguide 326. Demultiplexers ("DEMUXs"), such as demultiplexers 328 and 330, separate the optical signals into separate waveguides. The separate optical signals output from the DEMUXs 328 and 330 are represented by dashed lines 332 and 334, respectively. For example, ¼ of the optical power associated with the four optical signals carried by the waveguide 320 are reflected by the optical tap array 206 into the waveguide 324 and transmitted to the DEMUX 334, which demultiplexes the optical signals so that each optical signal is carried by a separate waveguide to the node 0, as indicated by dashed-line directional arrows 332. Note that each node can use a different set of frequencies for the channels, or at least one node can use the same set of frequencies for the channels.

Multibus optical interconnect fabrics are not limited to optically interconnecting four nodes. In other examples, optical fabrics can be configured to accommodate as few as 2 nodes and as many as 5, 6, 7, or 8 or more nodes. The maximum number of nodes may be determined by the optical power of the optical signals, the overall system loss, and the minimum sensitivity of the receivers used to detect the optical signals located at each node, as described below with reference to FIG. 6. In general, the optical tap arrays distributed along, a broadcast bus, or bundle of broadcast buses, are configured so that when a node broadcasts an optical signal, each of the nodes, including the sending node, receives approximately 1/n of the total optical power P of the optical signal, where n is the number of nodes.

Figure 4:
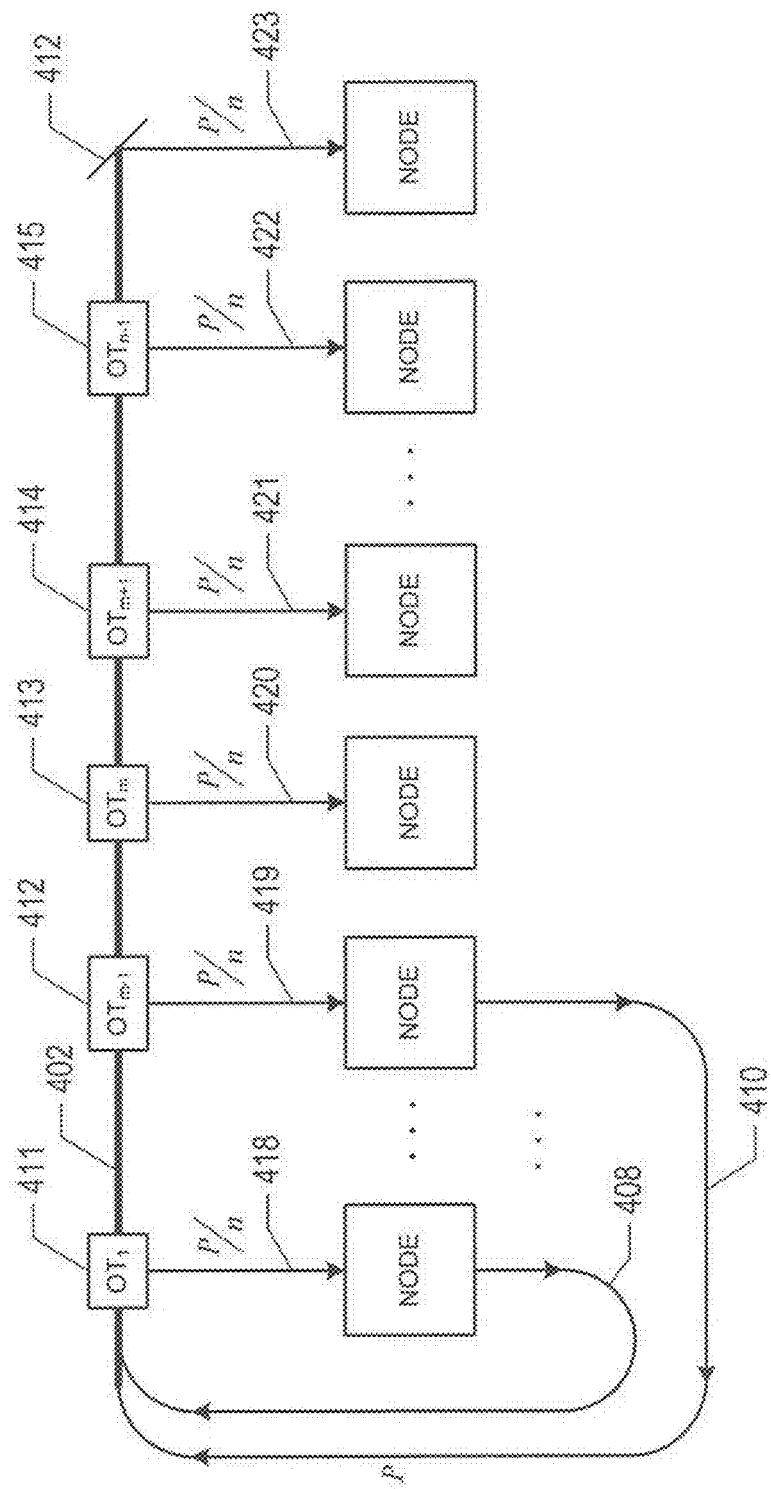
FIG. 4 shows a schematic representation of n nodes in optical communication over a bundle of broadcast buses.

FIG. 4 shows an example of n nodes in optical communication with a bundle of broadcast buses 402 coupled to n nodes, two of which are represented by nodes 404 and 406. The broadcast buses, such as broadcast buses 408 and 410, comprising the bundle of broadcast buses 402 can be composed of any suitable number of waveguides. The optical fabric includes n optical tap arrays distributed along the bundle of broadcast buses 402, a few of which are represented by optical tap arrays 411-416. Node 406 outputs optical signals onto the broadcast bus 410 with optical power P. The optical tap arrays are configured so that each node receives a reflected portion of the optical signals with approximately the same optical power of P/n, as indicated by directional arrows 418-423.

The optical tap arrays denoted by $OT_m$ in FIG. 4 reflect a fraction of the optical signal power to an optically coupled node in accordance with:

$$R_m \approx \frac{1}{(n-m+1)}$$

and transmit a fraction of the optical signal power in accordance with:

$$T_m \approx \frac{(n-m)}{(n-m+1)}$$

where m is an integer ranging from 1 to n. Thus, an optical tap array $OT_m$ receives an optical signal and outputs a reflected portion with optical power $PR_m$ toward an optically coupled node and outputs a transmitted portion with optical power $PT_m$, where $P=PR_m+PT_m+L_m$ with $L_m$ representing the optical power loss at the optical tap array $OT_m$ due to absorption, scattering, or misalignment. Note that the optical tap array 416 $OT_m$ can be a mirror that reflects the remaining portion of optical power transmitted by broadcast bus 402 to node 426.

Note that optical fabric examples describe diverting a portion of the optical signals generated by a node back to the same transmitting node. This is done primarily for two primary reasons: 1) ensures that the mirror reflectivity is identical for all the taps in an array of taps, and the tap structure is identical at each point on the bus except for the value of reflectivity of the tap array mirror. In practice, the optical tap arrays can be fabricated as a single piece of material and are distributed across all of the waveguides of a bundle of broadcast buses, as shown in FIGS. 2 and 3. In other words, it may not be practical in implementing an optical fabric with large numbers of waveguides per bundle with optical tap arrays that distinguish particular waveguides that do not divert optical signals. 2) By diverting optical signals back to the source node from which they originated, the source node is able to perform diagnostic tests on the optical signals, such as testing optical signal integrity.

In other examples, the broadcast buses of a multibus optical interconnect fabric can be implemented using star couplers. For example, returning to FIG. 1, a star coupler comprising one input port and four output ports can replace the broadcast bus 1 and optical tap arrays 106-109, where the input port carries the optical signals carried by broadcast bus 102 and each of the four output ports carriers one of the optical signals 111-114. Each star coupler can be configured so that an optical signal received in the input port is split into four output optical signals, each output optical signal carrying approximately ¼ of the optical power of the input optical signal.

Figure 5:
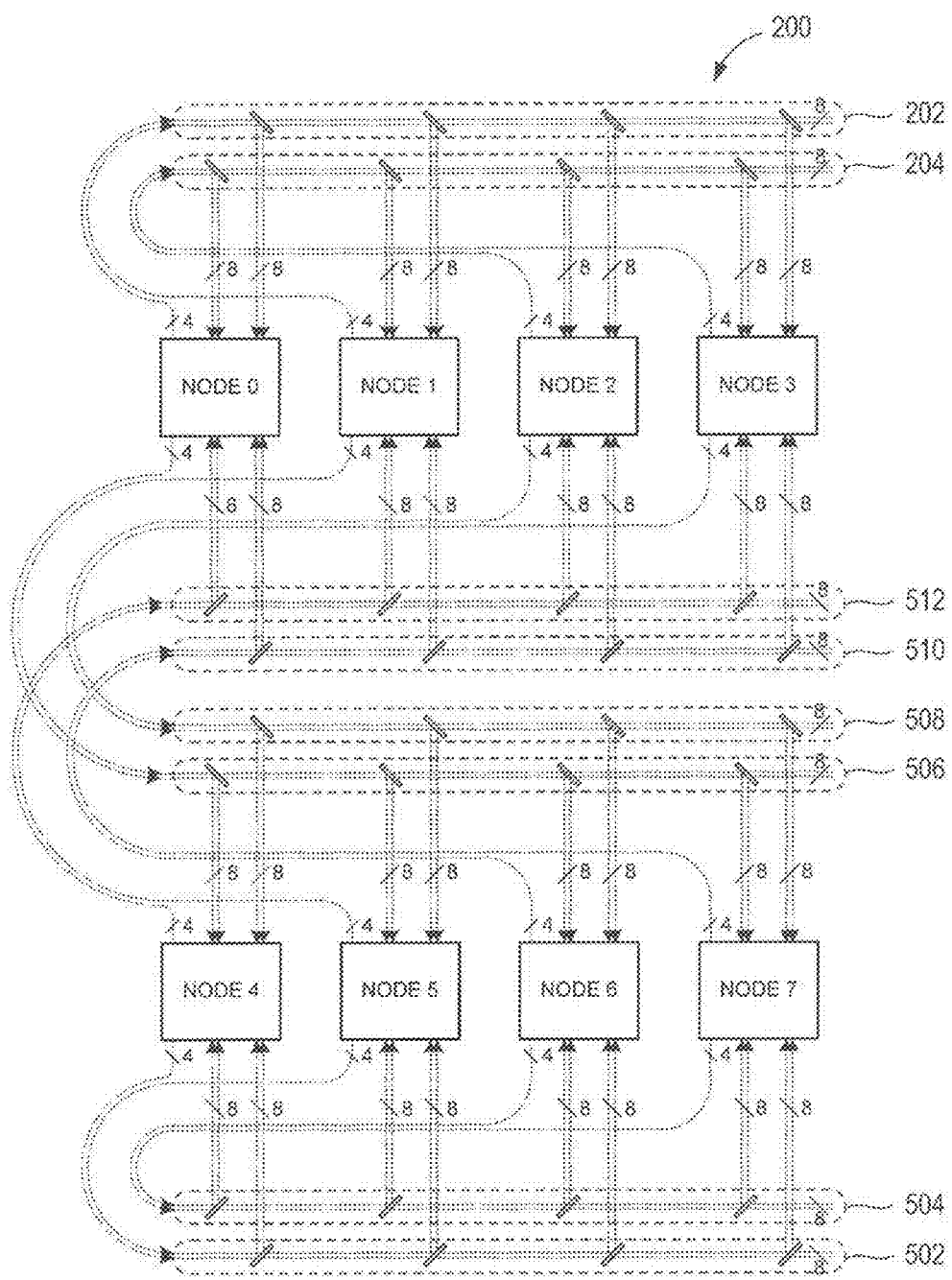
FIG. 5 shows a schematic representation of four example multi-bus optical interconnect fabrics.

The methods and systems herein are not limited to nodes broadcasting over a single multibus optical interconnect fabric. In other examples, nodes can communicated over more than one multibus optical interconnect fabric. FIG. 5 shows a schematic representation of an example of four multibus optical interconnect fabrics enabling eight nodes to broadcast optical signals. As shown in the example of FIG. 5, nodes 0-3 broadcast optical signals to each other over optical fabric 200, as described above. Like nodes 0-3, nodes 4-7 broadcast optical signals to each other over bundles of broadcast buses 502 and 504. FIG. 5 also reveals that nodes 0-3 broadcast optical signals to nodes 4-7 over bundles of broadcast buses 506 and 508, and that nodes 4-7 broadcast optical signals to nodes 0-3 over bundles of broadcast buses 510 and 512.

Receiver, Transmitter, and Transceiver Integrated Circuits

In certain embodiments, each node includes a receiver integrated circuit ("IC") that receives optical signals generated by a number of nodes. The process of receiving optical signals generated by the nodes at a single node is referred to as "fan in." For example, the optical signals generated by the four nodes 0-3, as described above with reference to FIG. 1, fan in to node 0. A receiving node may also include a separate transmitter IC to send optical signals to the other nodes. For example, a broadcast from one node to all the other nodes is referred to as "fan out."

Figure 6:
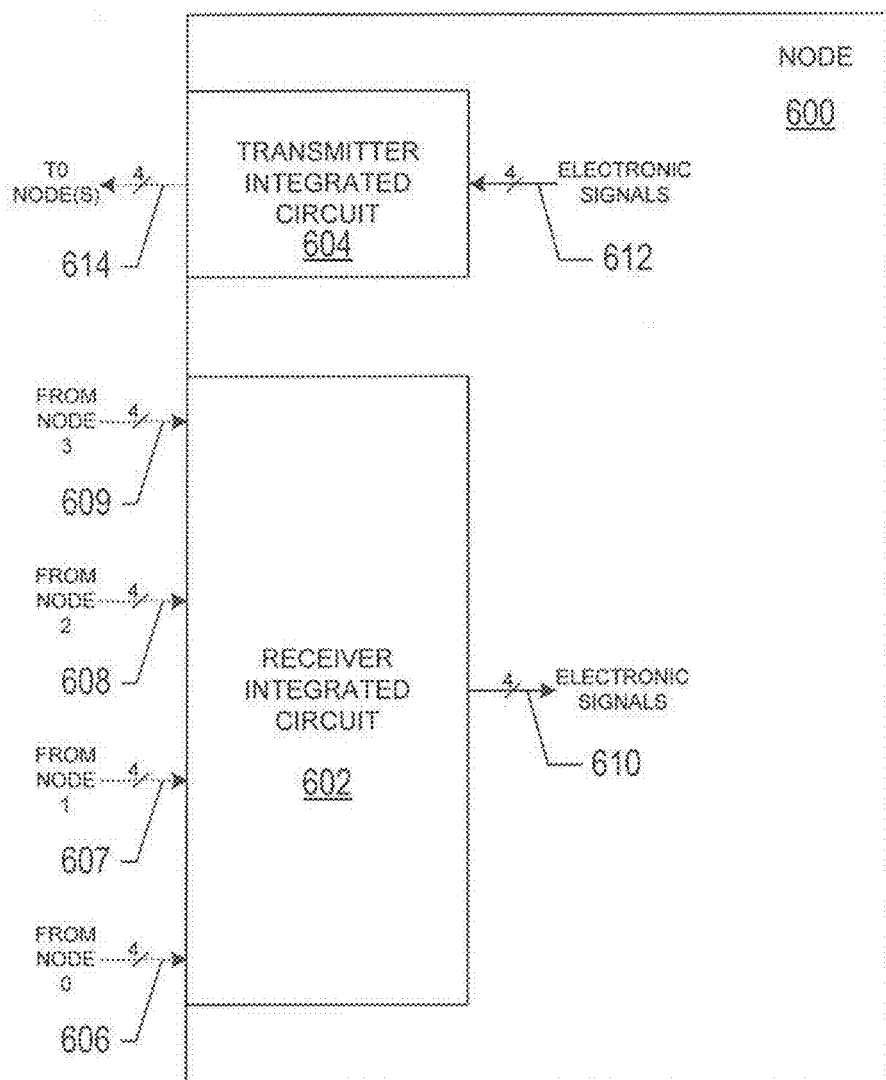
FIG. 6 shows an example of a first node including a receiver integrated circuit and a transmitter integrated circuit.

FIG. 6 shows an example of a node 600 that includes a receiver IC 602 and a transmitter IC 604. The receiver IC 602 receives optical signals from each of the nodes, including itself, as described above with reference to FIGS. 1-2. In the example of FIG. 6, each of the dotted-line directional arrows 606-609 represents a set of four optical signals input to the receiver IC 602. Each set of optical signals 606-609 is generated by one of the nodes 0-3 and is broadcast over a multibus optical interconnect fabric, such as the fabrics 100 and 200 described above with reference to FIGS. 1 and 2. The receiver IC 602 receives the four sets of optical signals 606-609 and produces a data stream encoded in electronic signals 610 that is output from the receiver IC 602 to the node 600 for processing. In other words, the receiver IC 602 is a fan-in receiver IC because the numerous optical signals produced by the four different nodes 0-3 are input to the receiver 602 and converted into electronic signals. The node 600 also sends a data stream produced by the node 600 and encoded in electronic signals 612 to the transmitter IC 604, which converts the electronic signals 612 into a set of four optical signals 614 that can be sent to at least one of the nodes 0-3 over a broadcast bus of a multibus optical interconnect fabric, as described above with reference to FIGS. 1 and 2.

Figure 7:
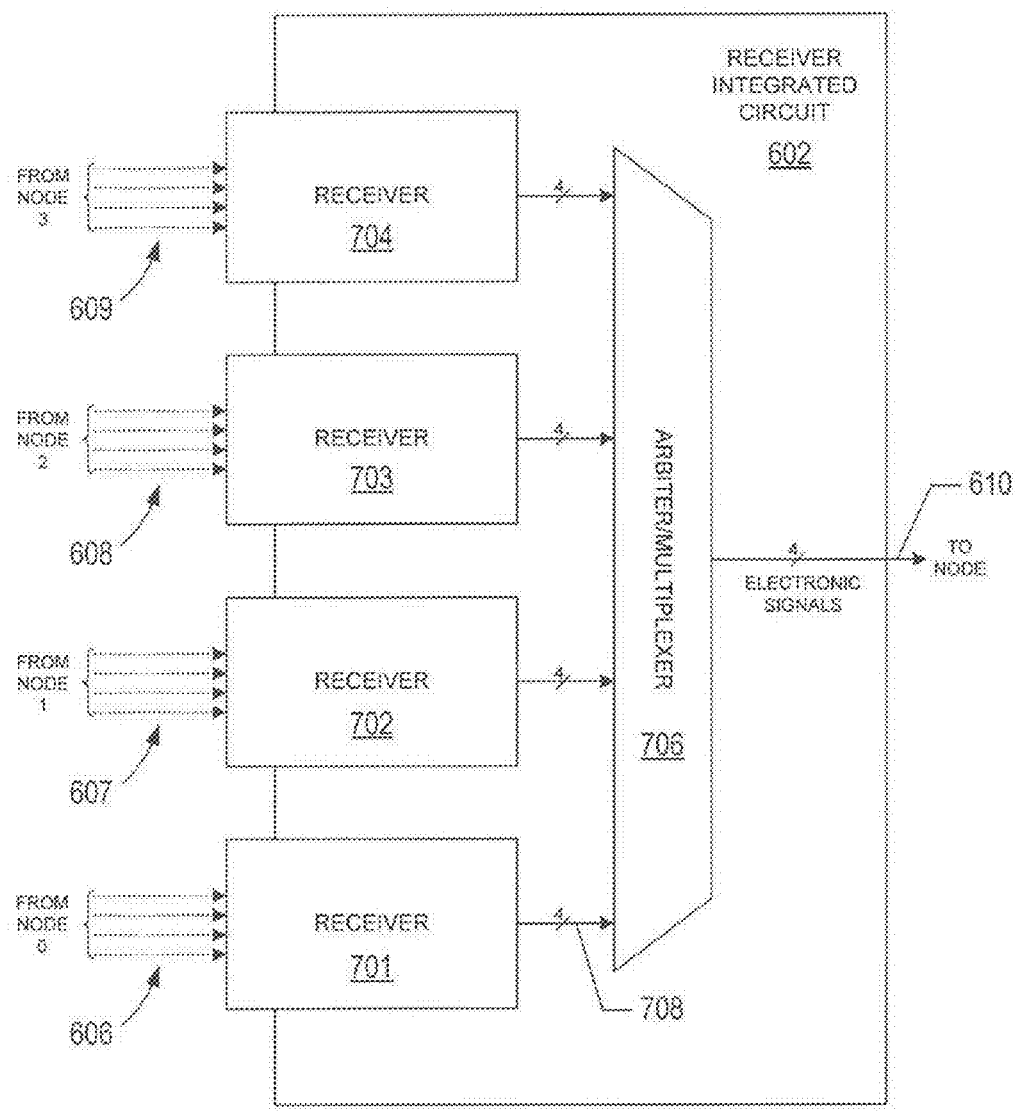
FIG. 7 shows a schematic representation of an example receiver integrated circuit.

FIG. 7 shows a schematic representation of the receiver IC 602. The receiver IC 602 includes four receivers 701-704 and an arbiter/multiplexer ("MUX") 706. Each receiver receives one of the four sets of optical signals 606-609 generated by a node and converts the set of optical signals into a serial data stream encoded in electronic signals that are sent to the arbiter/MUX 706. For example, the receiver 701 receives the set of optical signals 606 produced by node 0, may store the data in a buffer, and outputs electronic signals 708 encoding the same data to the arbiter/MUX 706. The receivers 701-704 each take turns sending electronic signals to the arbiter/MUX 706 as directed by the arbiter portion of the arbiter/MUX 706. Which receiver gets to send electronic signals to the arbiter/MUX 706 during a given time period is determined by the arbiter portion of the arbiter/MUX 706, which can use any one of many different kinds of well-known arbitration techniques. For example, the arbiter may implement round-robin arbitration, where each receiver is allotted a time period in a circular manner in which a receiver is allowed to send electronic signals to the arbiter/MUX 706. The arbiter/MUX 706 outputs the electronic signals received in turn from each of the receivers 701-704 as electronic signs 610 to the node 600 for processing. Note that each receiver may include a buffer to store the data encoded in the optical signals. When it is the receiver's turn to send data to the arbiter/MUX 706, the data stored in the buffer is encoded in electronic signals and sent to the arbiter/MUX 706.

Note that fan-in receiver ICs are not limited to having four receivers. In practice, fan-in receiver ICs can be scaled up or down and can be configured with any suitable number of receivers.

An optical signal arriving at a node includes at least one data packets. Each packet includes a header and user data. The header includes control information, such as information identifying the node that sent the packet and information identifying the node, or nodes, destined to receive the packet. Each receiver receives the packets sent by one of the nodes connected to the optical fabric, as described above, and examines the header information. On the one hand, if the receiving node is not identified as a destination node in the header, the receiver discards the data encoded in the packet. On the other hand, if the receiving node is identified as a destination node in the header, the receiver accepts the packet and the data is processed by the node. Because multiple packets can arrive at the same destination node concurrently, buffering may be used to temporarily store the user data sent to the destination node. Flow control can be used to prevent buffer overflow in cases where the rate of packet arrival from the optical fabric exceeds the rate that packets can be forwarded to the arbiter/MUX.

Figure 8:
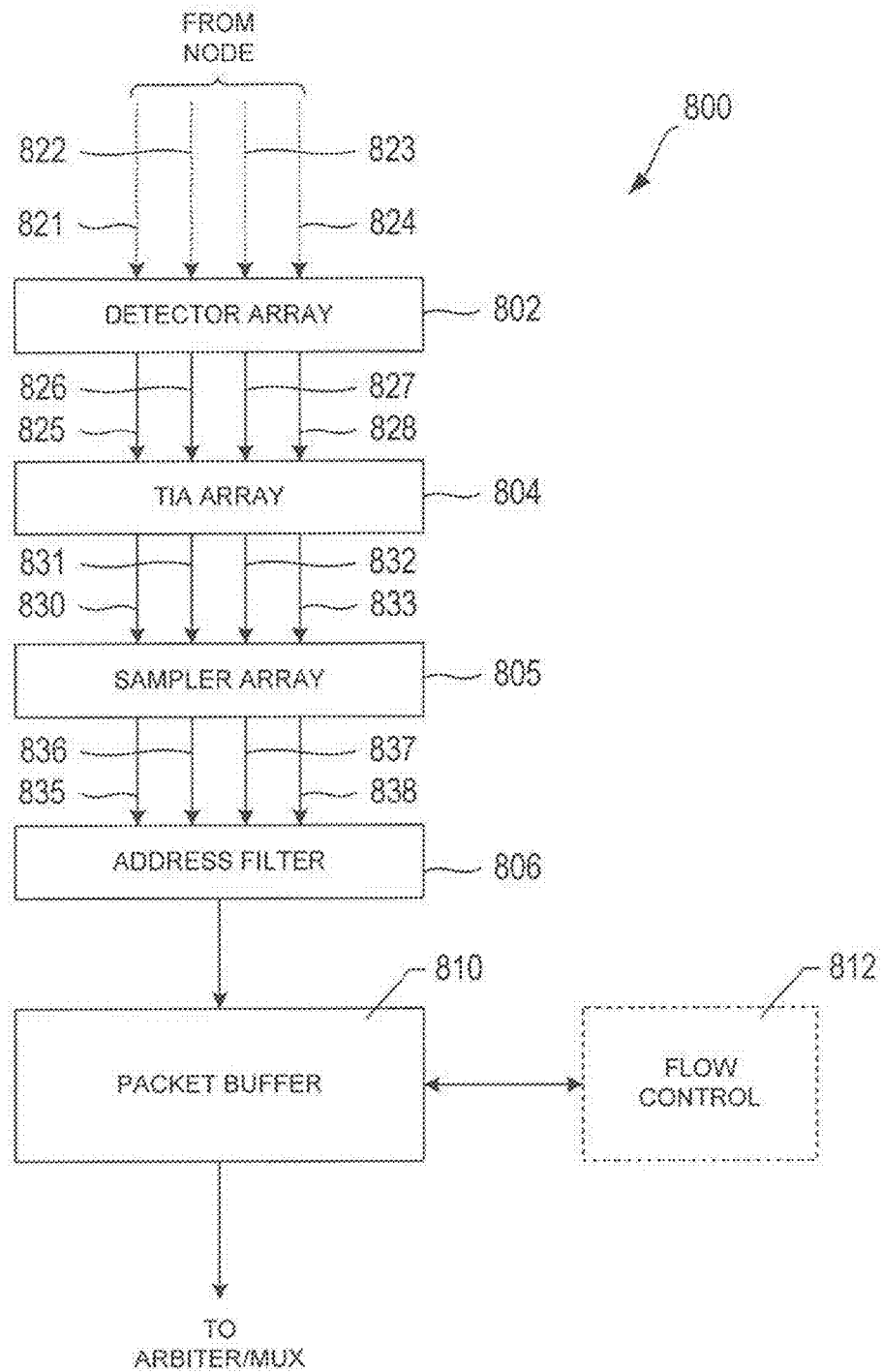
FIG. 8 shows a schematic representation of a first example receiver.

FIG. 8 shows a schematic representation of a receiver 800. The receiver 800 includes a detector array 802, a trans-impedance amplifier ("TIA") array 804, a sampler array 806, an address filter 808, a packet buffer 810, and may include a flow control 812. The detector array 802 includes a number of photodetectors that each converts an optical signal into an analog electronic signal. The TIA array 804 includes a number of TIAs, or operational amplifiers ("op amps"). Each TIA amplifies the electronic signal output from a corresponding photodetector. The sampler array 806 includes a number of samplers. Each sampler converts an analog electronic signal into a digital electronic signal encoding the same information. Note that photodetectors, TIAs, and samplers in the arrays 802, 804 and 806 are equal in number and are arranged in a one-to-one correspondence, enabling the detector array 802, TIA array 804, and the sampler array 806 to convert optical signals into digital electronic signals in parallel.

As shown in the example of FIG. 8, the optical signals 821-824 are received separately and simultaneously at the detector array 802. For example, each of the optical signals 821-824 can be transmitted to the detector array 802 in a separate optical fiber, as described above with reference to FIGS. 1 and 2. Each optical signal is detected by one photodetector of the detector array 802, and the photodetector generates a corresponding analog electronic signal. For example, four of the photodetectors of the detector array 802 convert the optical signals 821-824 into corresponding analog electronic signals 825-828. Each analog electronic signal output from a photodetector of the detector array 802 encodes the data of a corresponding optical signal and is input to a TIA of the TEA array 804. Four of the TIA's of the TIA array 804 receive the analog electronic signals 825-828 and output corresponding amplified analog electronic signals 830-833 to the sampler array 806. Each amplified analog electronic signal is sampled by one of the samplers in the sampler array 808 to produce a corresponding digital electronic signal. In the example of FIG. 8, four digital electronic signals 835-838 corresponding to the amplified analog electronic signals 830-833 are output separately from the samplers of the sampler array 806. Sampling the amplified analog electronic signals may be accomplished by treating one of the amplified electronic signals as a clock signal or by recovering the clock from the data stream. The digital electronic signals 835-838 output from the sampler array 806 encode the same packet information as the corresponding optical signals 821-824. When the digital electronic signals 835-838 are input to the address filter 808, the destination address portion of each header is examined. If the destination address of the header does not identify the node as a destination for the packet, the address filter 808 discards the packet. On the other hand, if the destination address of the header does identify the node as a destination of the packet, the address filter 808 transmits the data portion of the digital electronic signal to the packet buffer 810, which temporarily stores the data. Flow control 812 can be used to prevent buffer overflow in cases where the rate of packet arrival at the receiver 800 exceeds the rate that packets can be forwarded from the packet buffer 810 to the arbiter/MUX 706. For example, the flow control 812 can monitor the available buffer space and discard certain packets if no more storage space is available in the packet buffer 810.

Figure 9A:
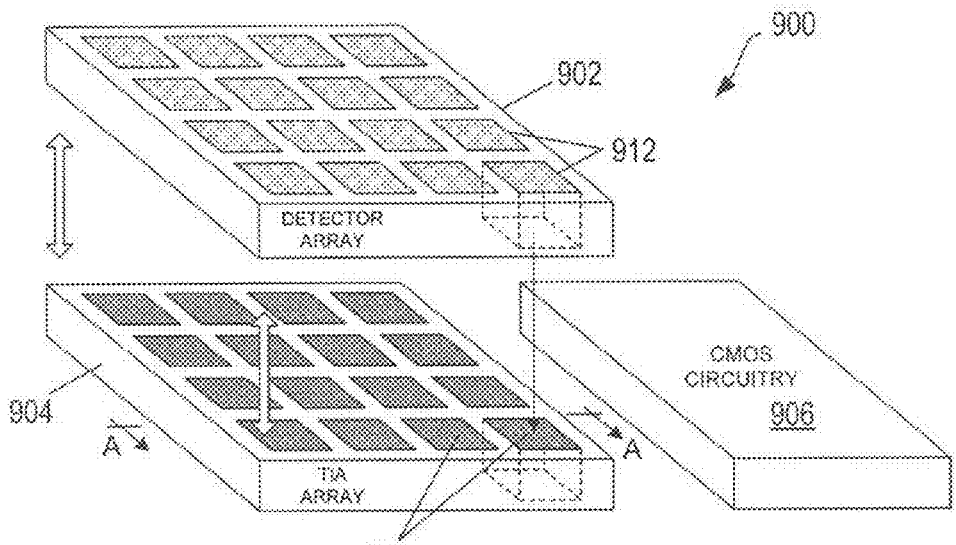
FIGS. 9A-9B show an example implementation of a receiver.

FIG. 9A shows an example of one possible implementation of a receiver 900. The receiver 900 includes a detector array layer 902, a TIA array layer 904, and CMOS circuitry 906 configured to implement a sampler, an address filter, and packet buffer/flow control. The layers 902 and 904 and CMOS circuitry 906 correspond to the components of the receiver 800 described above with reference to FIG. 8 and perform the same operations. Each photodetector of the layer 902 is electronically connected to a TIA of the layer 904. In the example of FIG. 9A, the detector array layer 902 includes 16 separately operated photodetectors 912 and the TIA array layer 904 includes 16 separately operated TIAs 914. For example, the photodetector 912 is electronically connected to a TIA 914. In certain embodiments, the photodetectors 912 can be p-i-n junction photodiodes. In alternative embodiments, the photodetectors 912 can be CMOS photodetectors.

Receivers are not limited to a square configuration of 16 photodetectors. Receives can also have any suitable number of photodetectors, and corresponding TIAs and can have any suitable arrangement.

Figure 9B:
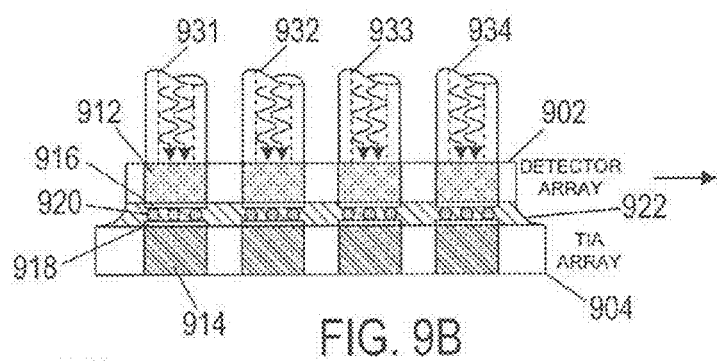

In certain embodiments, the detector array layer 902 can be flip-chip mounted to the TIA array layer 904 in order to make the path between each photodetector and a corresponding TIA as short as possible. FIG. 9B shows an example cross-sectional view of the detector array layer 902 flip-chip mounted to the TIA array layer 904 along a line A-A shown in FIG. 9A. In the example of FIG. 9B, a pad 916 of each photodetector 912 is electronically connected to a pad 918 of a TIA 918 via solder dots 920. A dielectric adhesive 922 substantially fills the space between the layers 902 and 904 and attaches the detector array layer 902 to the. In alternative embodiments, the pads 912 can be composed of germanium. FIG. 9B also shows the end portion of four optical fibers 931-934 optically coupled to the four photodetectors of the array 902. In the example of FIG. 9B, each optical fiber is butt coupled to a corresponding photodetector so that light output from a fiber core strikes a corresponding photodetector.

Figure 10:
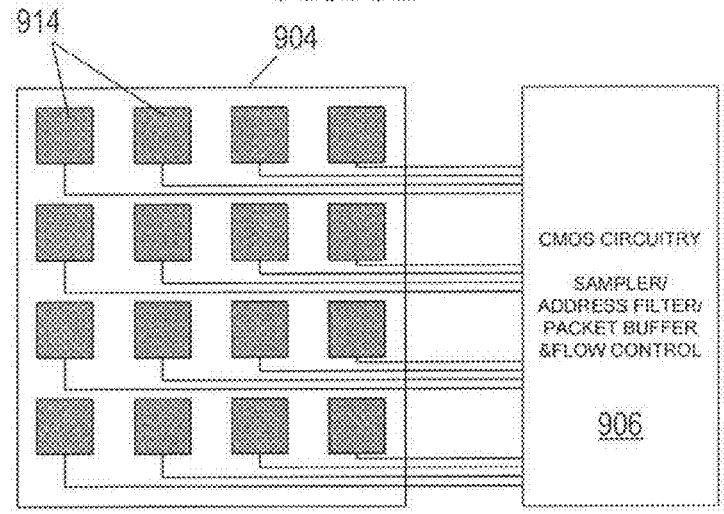
FIG. 10 shows a schematic representation of an example transimpedance amplifier electronically connected to CMOS circuitry.

FIG. 10 shows an example schematic representation of the TIA array layer 904 electronically connected to the CMOS circuitry 906. As shown in FIG. 10, each TIA 914 is electronically connected to the CMOS circuitry 906.

Figure 11:
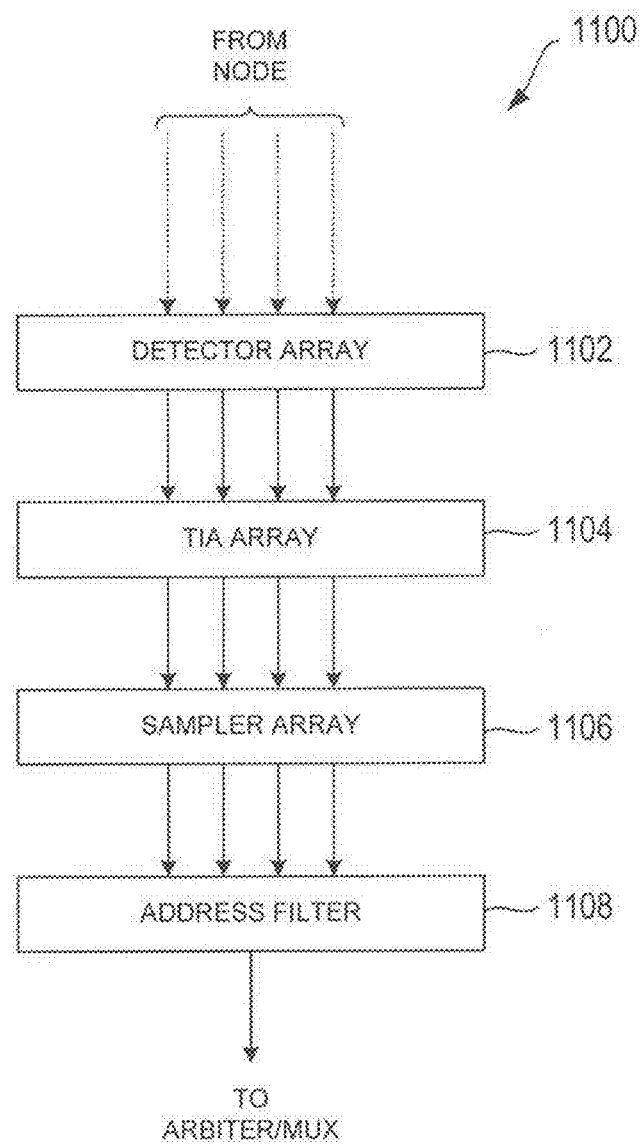
FIG. 11 shows a schematic representation of a second example receiver.

FIG. 11 shows a schematic representation of a receiver 1100. The receiver 1100 includes a detector array 1102, a TIA array 1104, a sampler array 1106, and an address filter 1108. The receiver 1100 is nearly identical to the receiver 800, except the packet buffer 810 and flow control 812 of the receiver 800 are omitted from the receiver 1100. Like the receiver 800, the detector array 1102 includes a number of photodetectors, each of which converts an optical signal into an analog electronic signal; the TIA array 804 includes a number of TIAs, each of which amplifies an analog electronic signal output from a corresponding photodetector; and the sampler array 1106 includes a number of samplers, each of which converts an analog electronic signal into a digital electronic signal. The photodetectors, TIAs, and samplers in the arrays 1102, 1104 and 1106 are equal in number and are arranged with a one-to-one correspondence, enabling the detector array 1102, TIA array 1104, and the sampler array 1106 to process information encoded in optical signals in parallel. The address filter 1108 examines the destination address portion of each header and determines whether to discard the data or transmit the data to an arbiter/MUX. Note that the receiver 1100 does not include a puffer. As a result, when a packet arrives as the receiver 1100, the information encoded in the packet is discarded if the receiver 1100 is not permitted to send data to the arbiter/MUX.

Additional input and output ports can be added to a fan-in receiver IC, enabling two or more fan-in receiver ICs to be daisy chained in order to accommodate a larger number of optical signals transmitted to the node. For example, consider the nodes 0-3 described above with reference to FIG. 1. Each of the nodes 0-3 can include a fan-in receiver IC, such as the fan-in receiver IC 800 described above with reference to FIG. 8, enabling each node to receive optical signals from the nodes 0-3. Now consider the multibus optical interconnect fabrics described above with reference to FIG. 5. In order for the nodes 0-3 to also receive optical signals from the four nodes 4-7, each of the nodes 0-3 may include a first fan-in receiver IC that receives optical signals from the nodes 0-3 and is daisy chained to a second fan-in receiver IC that receives optical signals from the nodes 4-7.

Figure 12:
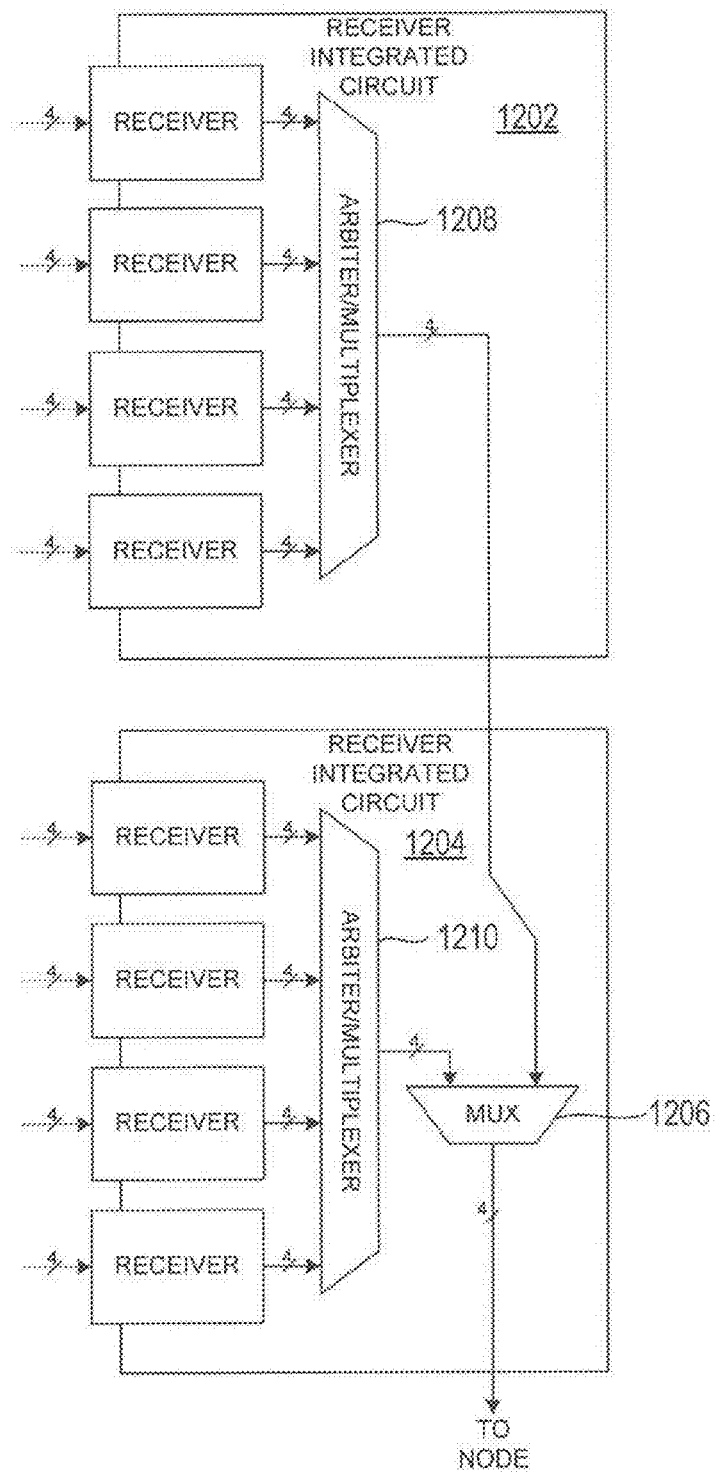
FIG. 12 shows an example of two daisy chained fan-in receiver integrated circuits.

FIG. 12 shows two daisy chained fan-in receiver ICs 1202 and 1204. The receiver ICs 1202 and 1204 are each configured and operated in the same manner as the receiver IC 800, except the receiver IC 1204 includes a MUX 1206 that is electronically connected to an arbiter/MUX 1208 of the receiver IC 1202 and is electronically connected to an arbiter/MUX 1210 of the receiver IC 1204. The arbiter/MUXs 1208 and 1210 input electronic signals to the MUX 1206, which combines the electronic signals into electronic signals that are sent to the node for processing.

Returning to FIG. 6, the node 600 includes a transmitter IC 604 that is operated separately by the node 600. The transmitter IC 604 enables the node 600 to multicast optical signals to other nodes connected to the interconnect fabric. FIG. 13 shows a schematic representation of an example transmitter IC 1300 that includes an array of vertical-cavity surface-emitting lasers ("VCSELs") 1302 connected to an array of VCSEL drivers 1304. Each VCSEL of the VCSEL array 1302 is electronically connected to a driver in the driver array 1304. Each VCSEL driver of the array 1304 receives an electronic signal from the node, produces an amplified version of the electronic signal, and applies the amplified electronic signal to an electronically connected VCSEL of the VCSEL array 1302. As shown in the example of FIG. 11, for electronic signals 1306-1309 are input to the driver array 1304. The driver array 1304 receives the electronic signals 1306-1309 and produces corresponding amplified electronic signals 1311-1314 that are applied to four electronically connected VCSELs in the VCSEL array 1302. Each VCSEL of the VCSEL array is directly modulated by an electronically connected VCSEL driver. For example, when a high amplitude portion of an electronic signal output from a drive is applied to an electronically connected VCSEL, a high amplitude portion of an optical signal is output from the VCSEL, and when a low amplitude portion of the electronic signal is applied by the driver to the VCSEL, a low amplitude portion of the same optical signal is emitted. As a result, four VCSELS of the 2.5 VCSEL array 1302 produce optical signals 1316-1319 encoding the same information as the corresponding electronic signals 1306-1309. Note that transmitters are not limited to four VCSELs and drivers. Transmitters can have any suitable number of VCSELs and corresponding drivers.

FIG. 14A shows an example of one possible implementation of a transceiver 1400. The transceiver 1400 includes a VCSEL array layer 1402, a VCSEL driver array layer 1404, and CMOS circuitry 1406 configured to receive electronic signals and apply the electronic signals to the operate drivers driver array 1404. FIG. 14B shows a cross-sectional view of the example transmitter 1400 with the VCSEL array 1402 flip-chip mounted to the VCSEL driver array 1404 along a line B-B shown in FIG. 14B. As shown in the example of FIG. 14B, a pad 1408 of each VCSEL 1406 is electronically connected to a pad 1412 of a driver 1410 via solder dots 1414. A dielectric adhesive 1416 attaches the VCSEL array 1402 to the VCSEL driver array 1404, FIG. 149 also shows the end portion of four optical fibers 1421-1424 optically coupled to the four VCSELs. The four optical fibers 1421-1424 can be part of a broadcast bus for sending the optical signals to other nodes, as described above with reference to FIGS. 1 and 2. In the example of FIG. 14B, the optical fibers 1421-1424 each include a lens element, such as lens element 1425, that focuses light output from a corresponding VCSEL into the core of an optical fiber. FIG. 14C shows an example schematic representation of the drivers 1410 in the driver array layer 1404 electronically connected to the CMOS circuitry 1406. As shown in example of FIG. 14, the CMOS circuitry 1406 receivers four electronic signals 1430 and send each of the electronic signals to one of the drivers 1410.

Note that transceivers are not limited to use of VCSELs. Transceivers can also be implemented with other types of semiconductor lasers, such as edge emitting lasers.

Figure 15:
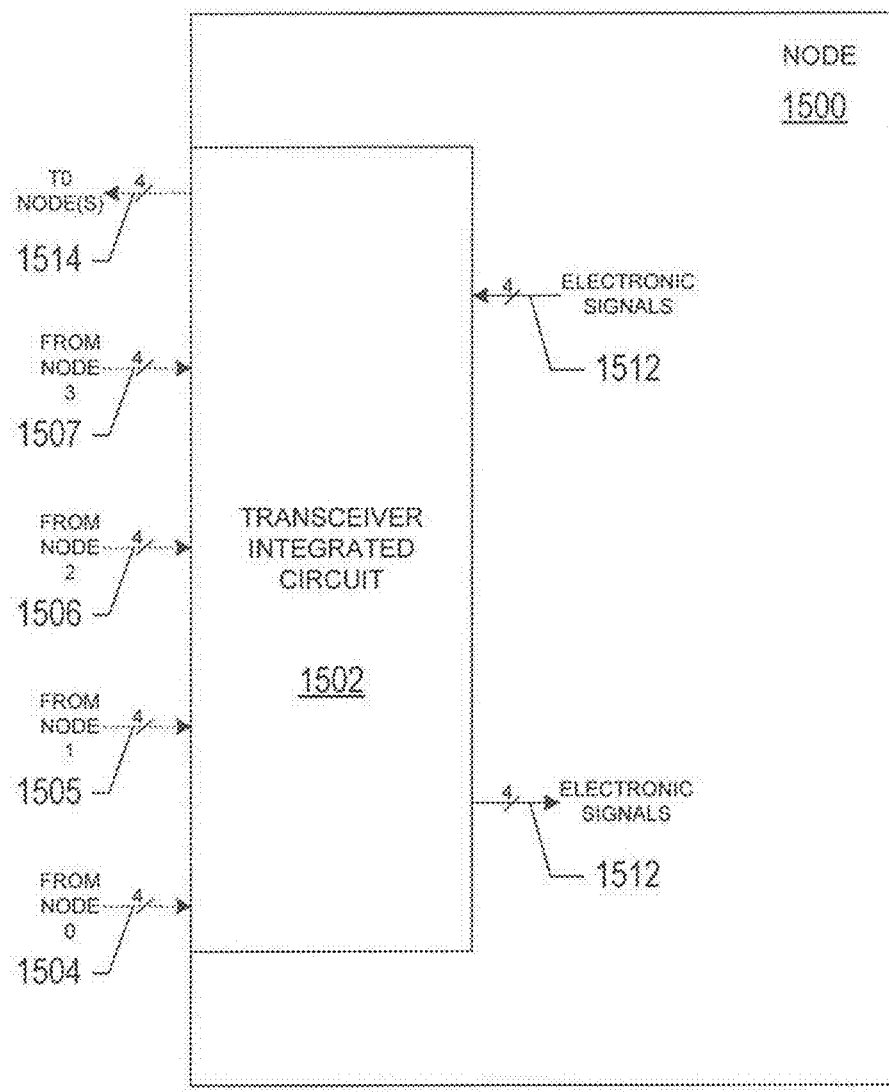
FIG. 15 shows an example of a node including a transceiver integrated circuit.

In alternative embodiments, a transceiver IC can be used to receiver optical signals from other nodes and generate optical signals that are to be sent to other nodes. FIG. 15 shows an example of a node 1500 that includes a transceiver IC 1502. In the example of FIG. 15, the transceiver IC 1502 receives four sets of optical signals 1504-1507 from four nodes, including itself, as described above with reference to FIGS. 1-2. The transceiver IC 1502 receives the four sets of optical signals 1504-1507 and produces a single data stream encoded in an electronic signal 1510 that is output from the transceiver IC 1502 to be processed by the node 1500. In other words, the transceiver IC 1502 operates as a fan-in receiver IC because the numerous optical signals produced by the four different nodes 0-3 are input to the transceiver IC 1502 and are converted into a single electronic signal that is output to the node for processing. The transceiver 1502 can also include a transmitter that enables the node 1500 to convert an electronic signal 1512 into a set of four optical signals 1514 that can be sent to at least one of the nodes 0-3 over a broadcast bus of a multibus optical interconnect fabric, as described above with reference to FIGS. 1 and 2.

Figure 16:
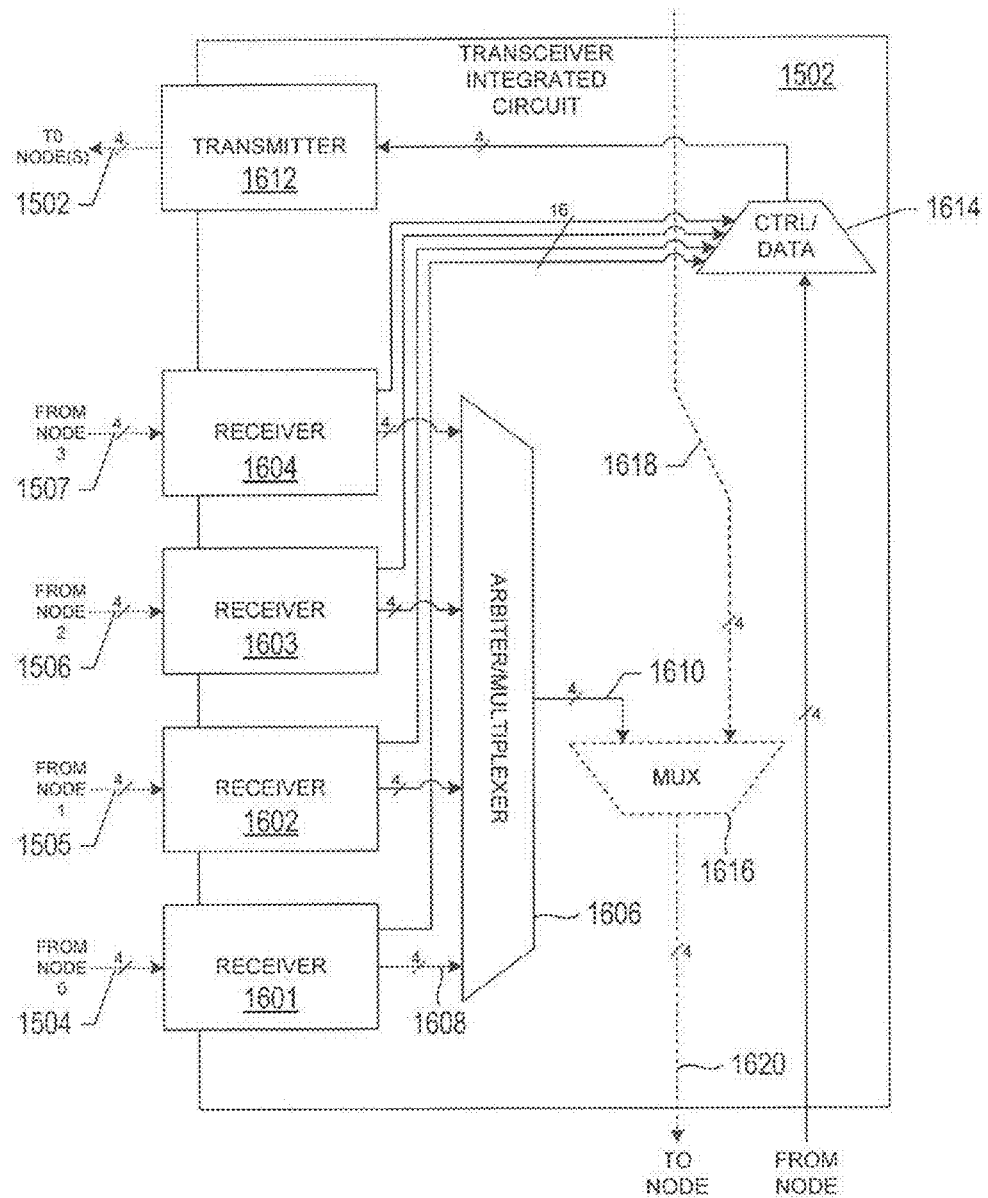
FIG. 16 shows a schematic representation of an example transceiver integrated circuit.

FIG. 16 shows a schematic representation of the example transceiver IC 1502. The transceiver IC 1502 includes four receivers 1601-1604 and an arbiter/MUX 1606. Like the receivers 701-704, described above with reference to FIG. 7, each of the receivers 1601-1604 receives one of the four sets of optical signals 1504-1507 and converts a set of optical signals into a serial data stream encoded in an electronic signal that is sent to the arbiter/MUX 706. For example, the receiver 1601 receivers the set of optical signals 1504 produced by node 0, converts the set of optical signals 1504 into an electronic signal 1608 that is output to the arbiter/MUX 1606. The receivers 1601-1604 each take turns sending electronic signals to the arbiter/MUX 1606 as directed by the arbiter portion of the arbiter/MUX 1606, as described above with reference to FIG. 6. The arbiter/MUX 1606 outputs the electronic signals generated by the receivers 1601-1604 one at a time as an electronic sign 1610. As shown in the example of FIG. 6, the transceiver IC 1502 includes a transmitter 1612 and a control/data MUX 1614. The transmitter 1612 can be configured and operated to convert electronic signals into optical signals that are sent over a broadcast bus, as described above with reference to FIGS. 13-14. The contra/data MUX 1614 is electronically connected to each of the receivers 1601-1604 and the transmitter 1612.

Figure 17:
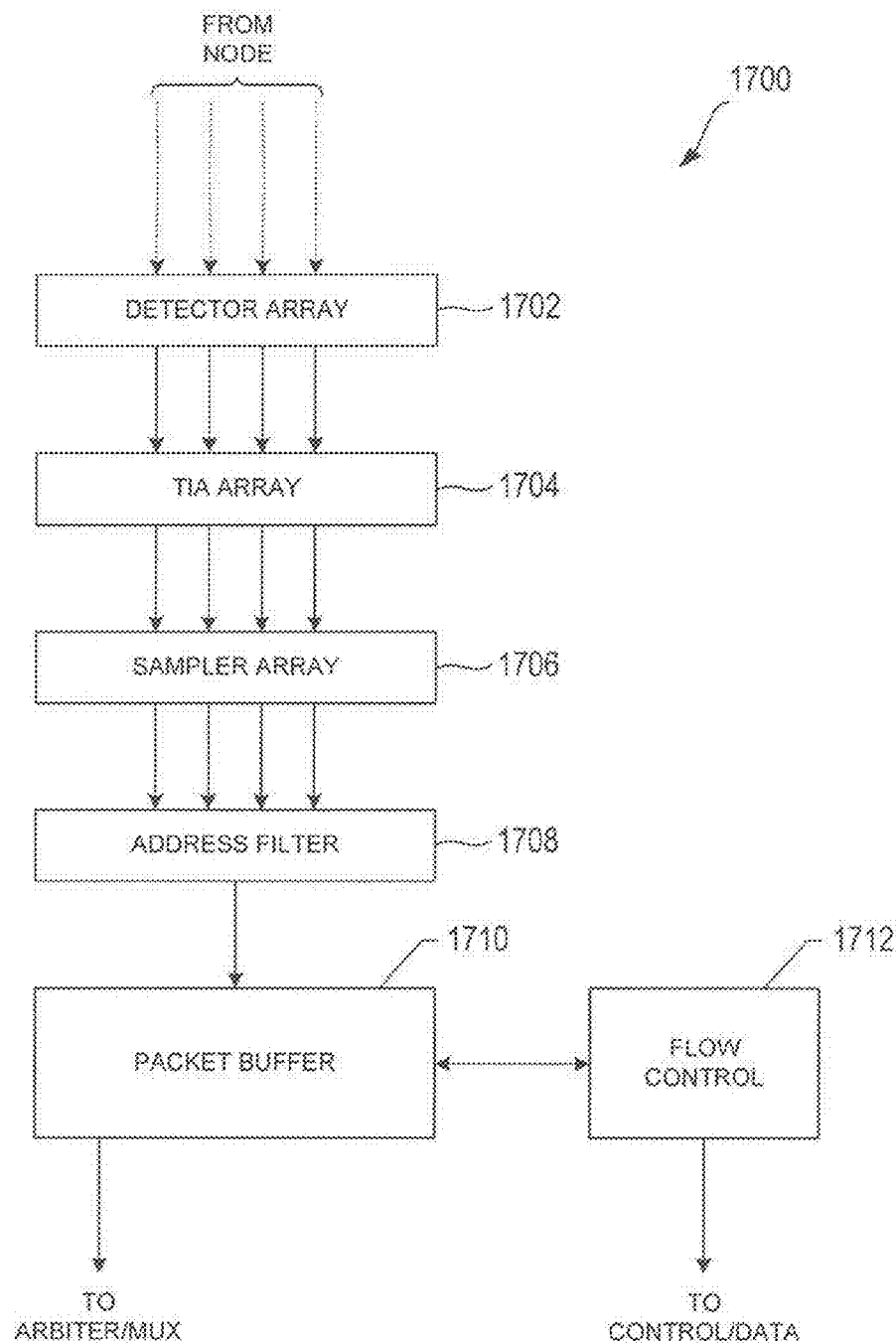
FIG. 17 shows a schematic representation of a second example receiver.

FIG. 17 shows a schematic representation of a receiver 1700. The receiver 1700 includes a detector array 1702, a TIA array 1704, a sampler array 1706, an address filter 1708, a packet buffer 1710, and a flow control 1712. The arrays 1702, 1704, 1706, filter 1708, buffer 1710, and flow control 1712 are operated in the same manner as the components of the receiver 800, as described above with reference to FIG. 8, except the flow control 1712 can also be used to periodically produce buffer status information regarding the amount of storage available in the packet buffer 1710. The flow control 1712 sends the status information to the control/data MUX 1614, shown in FIG. 16.

Returning to FIG. 16, the control/data MUX 1614 receives data produced by the node and receives buffer status information output from each of the receivers 1601-1604. Each of the receivers 1601-1604 periodically checks the amount of storage space available in their associated packet buffers, produces status information indicating how much space is available, and sends the buffer status information to the control/data MUX 1611, which forwards the information onto the transmitter 1612 along with data generated by the node. The status information generated by each of the nodes in a system can be used to prevent packet buffer overflow by periodically distributing buffer status information to all the nodes. Every node receives the status information and knows the status of all buffers in the system. In certain embodiments, when the status information received by a receiver indicates that the buffer to which the node transmits information to is full, the receiver may stop transmission, such as a broadcast, by sending an appropriate electronic stop signal to the control/data MUX 1614. In other embodiments, unlike the flow control applied to a broadcast, under a multicast routing scheme the node can send data to packet buffers of at least one of the destination nodes even though an associated packet buffer of a non-destination node is full.

A fan-in transceiver IC can also include input and output ports enabling the fan-in transceiver IC to be daisy chained with two or more transceiver ICs in order to accommodate a larger number of optical signals transmitted to the node. The transceiver IC 1502, shown in FIG. 16, also includes a MUX 1616. Electronic signals 1610 output from the arbiter/MUX 1606 are input to the MUX 1616. Electronic signals 1618 produced by another transceiver IC (not shown) can also be input to the MUX 1616, which combines the electronic signals 1610 and 1618 into one electronic signal 1620 that is sent to the node for processing.

Figure 18:
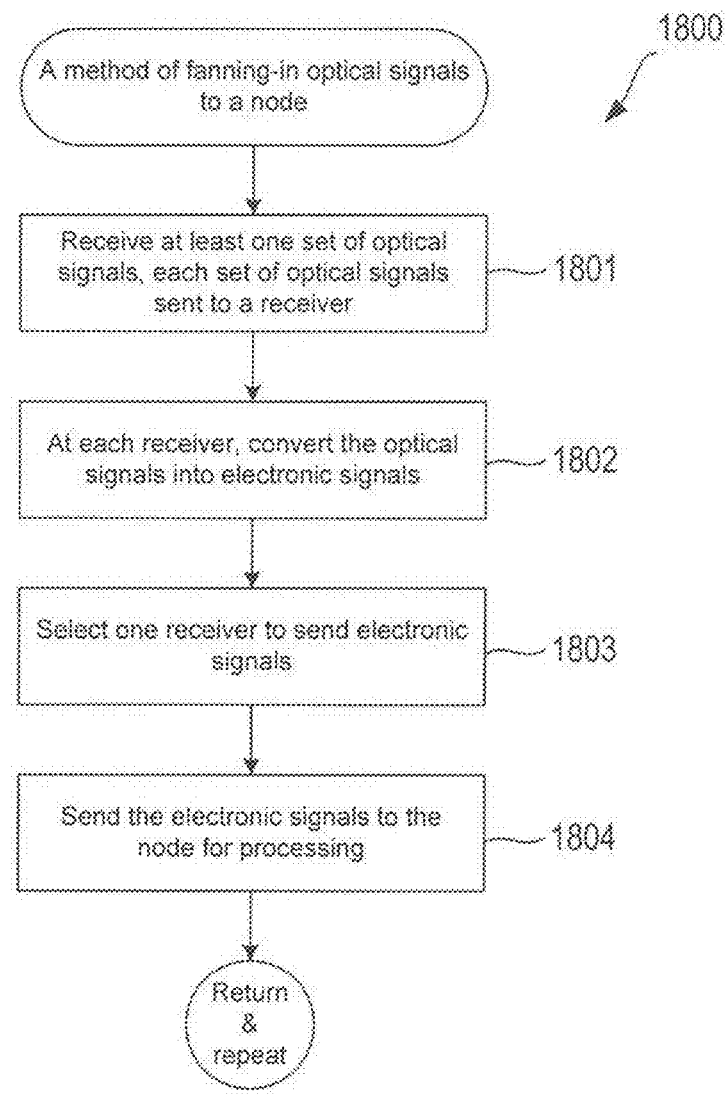
FIG. 18 shows a flow diagram summarizing a method of fanning-in optical signals to a node.

FIG. 18 shows a flow diagram summarizing a method of fanning-in optical signals to a node. In step 1801, at least one of the sets of optical signals are received. Each set of optical signals is transmitted in a separate broadcast bus to a receiver of the node, as described above with reference to FIGS. 6 and 7. In step 1802, at each receiver, a set of optical signals is converted into a data stream encoded in an electronic signal, as described above with reference to FIG. 7. In step 1803, one receiver at a time is selected to send an electronic signal to a multiplexer, as described above with reference to FIG. 7. In step 1804, the electronic signal is transmitted to the node for processing, as described above with reference to FIG. 7.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented for purposes of illustration and description. They are not intended to be exhaustive of or to limit this disclosure to the precise forms described. Obviously, many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

The invention claimed is:

1. A fan-in integrated circuit of a node comprising:
   an arbiter/multiplexer;
   a plurality of receivers, each receiver electronically connected to the arbiter/multiplexer, wherein each receiver is configured to receive optical signals over a corresponding optical broadcast bus and convert the optical signals into a data stream encoded in electronic signals, and each receiver comprises an array of photodetectors, where each photodetector receives and converts one of the optical signals into analog electronic signals, and
   wherein the arbiter/multiplexer selects one receiver at a time to send the electronic signals to the arbiter/multiplexer which outputs the electronic signals to the node for processing;

wherein a receiver further comprises:
a trans-impedance amplifier ("TIA") array, each TIA is electronically connected to a photodetector and amplifies the analog electronic signals output from the photodetector;
a sampler array, each sampler electronically connected to a TIA of the TIA array and converts the analog electronic signals into digital electronic signals; and
an address filter electronically connected to the sampler array that checks the destination address of packets encoded in the digital electronic signals and discards the data encoded electronic signals not destined for the node.

2. The integrated circuit of claim 1, further comprises a packet buffer electronically connected to the address filter and electronically connected to the arbiter/multiplexer, wherein the packet buffer receives the digital electronic signals and encodes data destined for the node and temporarily stores the data.

3. The integrated circuit of claim 2, further comprises a flow control electronically connected to the packet buffer, wherein the flow control prevents buffer overflow when the rate of packet arrival at the receiver exceeds the rate that packets are forwarded in electronic signals from the packet buffer to the arbiter/multiplexer.

4. The integrated circuit of claim 1, wherein the detector array is flip-chip mounted to the integrated circuit such that each photodetector is connected directly to a TIA.

5. A fan-in integrated circuit of a node comprising:
an arbiter/multiplexer;
a plurality of receivers, each receiver electronically connected to the arbiter/multiplexer, wherein each receiver is configured to receive optical signals over a corresponding optical broadcast bus and convert the optical signals into a data stream encoded in electronic signals, and each receiver comprises an array of photodetectors, where each photodetector receives and converts one of the optical signals into analog electronic signals, and
wherein the arbiter/multiplexer selects one receiver at a time to send the electronic signals to the arbiter/multiplexer which outputs the electronic signals to the node for processing;
the integrated circuit further comprising:
a transmitter optically coupled to an optical broadcast bus; and
a control/data multiplexer electronically connected to the receivers, the node, and the transmitter, wherein the control/data multiplexer receives buffer status information from each of the receivers and a data stream encoded in electronic signals generated by the node and transmits the electronic signals to the transmitter based on the status information.

6. The integrated circuit of claim 5, wherein the transmitter further comprises:
an array of lasers; and
a driver array, wherein each driver is electronically connected to a laser and directly modulates the laser in order to convert the electronic signals generated by the node into optical signals.

7. The integrated circuit of claim 6, wherein the array of lasers is flip-chip mounted to the integrated circuit such that each laser is connected directly to a driver.

8. A fan-in integrated circuit of a node comprising:
an arbiter/multiplexer;
a plurality of receivers, each receiver electronically connected to the arbiter/multiplexer, wherein each receiver is configured to receive optical signals over a corresponding optical broadcast bus and convert the optical signals into a data stream encoded in electronic signals, and each receiver comprises an array of photodetectors, where each photodetector receives and converts one of the optical signals into analog electronic signals, and
wherein the arbiter/multiplexer selects one receiver at a time to send the electronic signals to the arbiter/multiplexer which outputs the electronic signals to the node for processing;
the integrated circuit further comprising:
a multiplexer including:
a first input electronically connected to the output of the arbiter/multiplexer;
a second input electronically connected to a second optical fan-in integrated circuit of the node; and
an output, wherein the multiplexer combines electronic signals received from the arbiter multiplexer and the second integrated circuit into electronic signals that are sent to the node for processing.

9. An optical bus fan-in integrated circuit for a node comprising:
the integrated circuit comprising therein:
an arbiter/multiplexer; and
a plurality of receivers, each receiver for connection to an optical bus carrying multiple data channels, each receiver having an output electronically connected to the arbiter/multiplexer,
wherein each receiver comprises:
an array of photodetectors, each photodetector receives and converts one channel from a corresponding optical bus into an analog electronic signal;
a trans-impedance amplifier ("TIA") array, each TIA being electronically connected to a corresponding photodetector;
a sampler array, each sampler electronically connected to a corresponding TIA of the TIA array to convert a corresponding amplified analog electronic signal into a digital electronic signal; and
an address filter, electronically connected to the sampler array, that checks a destination address of packets encoded in the digital electronic signals and discards packets not addressed to the node.

10. The optical bus fan-in integrated circuit of claim 9, further comprising a first multiplexer connected to receive output from the arbiter/multiplexer and output from a second arbiter/multiplexer of a second optical bus fan-in integrated circuit.

11. The optical bus fan-in integrated circuit of claim 9, further comprising:
a transmitter for transmitting data from the node to at least one other node; and
a control/data multiplexer connected to receive data from each of the receivers and from the node, an output of a second multiplexer being input to the transmitter.

12. The optical bus fan-in integrated circuit of claim 11, wherein the control/data multiplexer is configured to receive buffer status information from each of the receivers and a data stream output by the node and to provide output to the transmitter for transmission.

13. The optical buss fan-in integrated circuit of claim 9, further comprising:
a packet buffer receiving output from the address filter and providing input to the arbiter/multiplexer; and
a flow control for controlling operation of the packet buffer.

* * * * *